United States Patent [19]

Peiffer

[11] Patent Number: 5,064,407
[45] Date of Patent: Nov. 12, 1991

[54] METHOD OF MANUFACTURING A CELLULOSE ABSORBENT PRODUCT

[75] Inventor: Norman A. Peiffer, Maumee, Ohio

[73] Assignee: The Andersons, Maumee, Ohio

[21] Appl. No.: 492,711

[22] Filed: Mar. 13, 1990

[51] Int. Cl.$^5$ ............................................. B02C 11/00
[52] U.S. Cl. ........................................ 241/3; 241/9; 241/12; 241/13; 241/29
[58] Field of Search ...................... 241/3, 6, 9, 12, 13, 241/15, 16, 21, 24, 29

[56] References Cited

U.S. PATENT DOCUMENTS

| 453,364 | 6/1891 | Taylor | 241/9 X |
| 3,491,952 | 1/1970 | Krolopp | 241/13 |
| 4,757,948 | 7/1988 | Nonaka et al. | 241/9 X |

Primary Examiner—Timothy V. Eley
Attorney, Agent, or Firm—Gifford, Groh, Sprinkle, Patmore and Anderson

[57] ABSTRACT

An absorbent cellulose product and method of making the product. Preferably chaff and pith corncob components form the cellulose starting material which is reduced, pelletized, crumbled and classified to produce a granular product of compact bodies having irregular surfaces.

13 Claims, No Drawings

METHOD OF MANUFACTURING A CELLULOSE ABSORBENT PRODUCT

BACKGROUND OF THE INVENTION

1. Field of the Invention

This invention relates to an absorbent product, and, more particularly, this invention relates to a cellulose absorbent material which has been processed to provide a granular product of compacts which have an irregular surface without sharp edges and a size compatable for loose distribution in the area of use.

2. Description of the Prior Art

It is well known that cellulose fibers are good absorbents for soluble oils, water and water based fluids and even heavy oils.

While clay products have enjoyed wide spread use as absorbents, the realization that cellulose offers far greater absorbtion has received attention. With ever increasing need to clean up oil spills and dispose of hazardous waste this attention has been accelerated. Of particular note is the fact that a cellulose product is biodegradable and that it can be incinerated adding a BTU value to the sorbed product which enhances energy recovery or make possible the incineration itself without application of external heat or fuel.

While wood and other plant celluloses such as rice hulls can be processed in useful absorbent products, particularly under the teachings of the present invention, the preferred embodiment of the invention employs corncob products.

Approximately 60% of the corncob's weight is made up of hard woody ring. This portion will absorb approximately 100% of its weight in oil and 133% of its weight in water. The pith and chaff portion of the corncob are the lighter components and make up the balance of the corncob weight. In their loose form, after having been reduced, for example by grinding rolls and a hammer mill, these lighter ends can absorb well in excess of 400% of their weight in some oils and water and water based liquids.

Such a loose, lighter corncob product of chaff and pith which has been separated from the hard woody ring is produced by The Andersons in Maumee, Ohio and is marketed under the trademark SLIKWIK ®. This product is most often used for absorbing organic wastes. The product and its use for removing oil or oily substances from the surface or upper layer of a body of water is set forth in U.S. Pat. No. 3,617,564. The SLIKWIK ® product is extremely lightweight having a density between 5 and 20 lb/ft$^3$, making its use in wind conditions sometimes difficult. To overcome this disadvantage, the product is put into 3" diameter by 48" long socks for absorbtion of wastes, for example adjacent to machine tools to absorb cutting fluids.

To fill the need for a denser product and a product particularly adapted for absorbing water and water base substances, The Andersons produce a pellet product marketed under the trademark LITE-R-COBS ®. This pelled product is made from the lightweight chaff and pith corncob components and is cylindrical having a nominal ¼" diameter with random lengths normally between ¼" and ½". This pellet product has a density between 35 and 42 lb/ft$^3$, and because of its higher density and hardened surface, it has a reduced absorbtion capacity, particularly for organic substances such as heavy motor oil.

SUMMARY OF THE INVENTION

The present invention includes a process for making a new cellulose absorbent product which is somewhat smaller than the presently available pellets, having a slightly reduced density over the pellets, but having an increased surface area to increase its absorbtion capacity and having an irregular shaped surface so as to be amenable to use in areas subject to walking traffic. The sharp edges of the pellet product making it unsuitable for this use. The process for producing this new absorbent product includes the following steps:

A) Reducing a naturally cellulose material to an intermediate pulverulent product.

B) Pelletizing the intermediate pulverulent product by passage through a die to produce an intermediate pellet product having a nominal diameter of at least 3/16" and preferably ¼".

C) Crumbling the intermediate pellet product to produce the compact bodies of the invention.

D) Classifying the compact bodies to produce a granular product of the bodies having a given screen size range. This range is preferably between ⅛ and 10 mesh.

The crumbling step of the process is accomplished in a unit including two spaced rolls one of which has circumferentially spaced longitudinally extending cutters and the other of which has longitudinally spaced circumferentially extending cutters so that as the intermediate pellet is passed between the rolls it produces the compact bodies of the invention. Each of the rolls has 10 cutters per inch to produce the product in the preferred ⅛ to 10 mesh size. The crumbling action is effected by rotating the roll having the longitudinally extending cutters at a higher speed than the roll having the circumferentially extending cutters.

In the preferred form of the process, the naturally occuring cellulose material which is used in step A) of the process consists of corncob components. These corncob components are preferably the chaff and pith with only a minor amount of woody ring. Preferably these components consist essentially of 91–96% chaff, 1–4% pith and 3–5% woody ring.

The absorbent cellulose granular product of the invention is in the form of compact bodies having an irregular surface and size which passes through the ⅛ mesh screen and is retained on the number 10 screen, being produced by the process outlined above. Preferably the cellulose material is corncob components with no more than 5% woody ring content. The compact bodies are crumbled extruded pellets, such compact bodies having an irregular surface and a screen size between ⅛ and 10.

DETAILED DESCRIPTION OF THE PRESENTLY PREFFERED EMBODIMENT

In the preferred embodiment of this invention, corn is first shelled or stripped off the cob so that the cob forms the starting cellulose material, or stored corncobs are used. The cobs are reduced or comminuted by grinding rolls and a hammer mill. The lighter chaff material is separated by air classification; the heavier hard woody ring is removed by air and screening; and the light pith is largely fine powder which passes through a 30 mesh screen. The chaff has long strands which would be retained on ⅛ or larger screen. The chaff, which includes the fine chaff or beeswing and coarse chaff, and the pith form the pulverulant material which is pelletized. Some hard woody ring material remains so that the composition of the pulverulant material and the final granular material is in the range of 91-96% chaff, 1-4% pith and 3-5% woody ring. The chaff components have a 90-95% coarse chaff content and a 5-10% beeswing content.

The pulverulent material is pelletized under high pressure by being forced through dies having ¼" openings to produce a pellet having a nominal ¼" diameter with random lengths usually falling between ¼ and ½" in length. Water is added to the pulverized feed stock to produce the pellet with the desired integrity.

The intermediate pellet product is then passed through a crumbling unit to produce compact bodies having irregular shapes. Finally, these compact bodies are classified to produce a granular product having a screen size range between ⅛ and 10. The average size is somewhat less than a 1/10". The ⅛ screen size has an opening of 0.125 inches and the number 10 screen has an opening of 0.0787 inches which is larger than 5/64".

In the preferred form of the invention the crumbling step is accomplished in a model 855-S crumbling unit manufactured by California Pellet Mill Company of San Francisco Calif. This unit utilizes two spaced parallel rolls one of which has circumferentially spaced longitudinally extending cutters and the other of which has longitudinally spaced circumferentially extending cutters. There are 10 cutters per inch which have been established by a LePage cut. The roll having the longitudinally extending cutters is rotated at a higher speed of the order of 570 RPM and the other roll is rotated at a speed of approximately 440 RPM. The rolls are 8" in diameter producing surface speeds of approximately 1,200 feet per minute and 900 feet per minute. The gap between the rolls is 1/10 to ⅛ of an inch.

The irregularly shaped compact bodies of the granular product of this invention have an increased irregular surface area per unit volume over the intermediate pellet product and produce absorbtion rates between the pulverulant intermediate material and the pellet.

The embodiments of the invention in which an exclusive property or privilege is claimed are defined as follows:

1. A process for producing an absorbent product comprising the following steps:
   A) reducing a naturally occurring cellulose material to an intermediate pulverulent product;
   B) pelletizing the intermediate pulverulent product by passage through a die to produce a intermediate pellet product having a nominal diameter of at least 3/16";
   C) crumbling the intermediate pellet product to produce compact bodies; and
   D) classifying the compact bodies to produce a granular product of said bodies having a given screen size range.

2. The process according to claim 1 wherein in step B) the intermediate pulverulent product is pelletized to an intermediate pellet product having a nominal diameter of ¼".

3. The process according to claim 1 wherein the compact bodies produced in step C) have an irregular surface.

4. The process according to claim 3 wherein in step D) the compact bodies are classified to produce a granular product having a screen size between ⅛ and 10.

5. The process according to claim 1 wherein in step C) the crumbling is accomplished in a unit including two spaced parallel rolls one of which has circumferentially spaced longitudinally extending cutters and the other of which has longitudinally spaced circumferentially extending cutters and the intermediate pellet product is passed between the rolls to produce the compact bodies.

6. The process according to claim 5 wherein in step C) each roll has ten cutters per inch.

7. The process according to claim 6 wherein in step C) the roll having the longitudinally extending cutters is rotated at a higher speed than the roll having the circumferentially extending cutters.

8. The process according to claim 1 wherein the naturally occurring cellulose material in step A) consists essentially of corncob components.

9. The process according to claim 8 wherein the corncob components in step A) consists essentially of chaff and pith with a minor amount woody ring.

10. The process according to claim 9 wherein between steps A) and B) water is added to said intermediate pulverulent.

11. The process according to claim 10 wherein the corncob components in step A) consists essentially of 91-96% chaff, 1-4% pith, and 3-5% woody ring.

12. The process according to claim 11 wherein said chaff components consists essentially of 5-10% beeswing and 90-95% course chaff.

13. The process according to claim 12 wherein the density of the granular product produced in step D) is 30-33 lb/ft³.

* * * * *